US008031670B2

(12) United States Patent
Johansson et al.

(10) Patent No.: US 8,031,670 B2
(45) Date of Patent: Oct. 4, 2011

(54) SYSTEMS AND METHODS FOR SELECTING THE SIZE OF A CONTROL REGION OF A DOWNLINK SUBFRAME

(75) Inventors: Anders Johansson, Hasselby (SE); Leo Hedlund, Alvsjo (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 443 days.

(21) Appl. No.: 12/270,290

(22) Filed: Nov. 13, 2008

(65) Prior Publication Data

US 2010/0120424 A1 May 13, 2010

(51) Int. Cl.
*H04W 4/00* (2009.01)
(52) U.S. Cl. ...................................... 370/330
(58) Field of Classification Search .................. 455/561, 455/435.1, 434, 436, 445, 450, 452.2, 433, 455/432.3, 70, 548, 503, 521, 452.1; 370/204, 370/330, 329, 344, 336, 347, 328, 343, 477, 370/436, 341, 331, 208, 445, 345, 326, 503, 370/278, 252, 342, 441, 236, 310; 375/132, 375/347, 130, 260, 148, 340
See application file for complete search history.

(56) References Cited

U.S. PATENT DOCUMENTS

| | | | | |
|---|---|---|---|---|
| 5,442,660 A * | 8/1995 | Kuo et al. | ...................... | 375/134 |
| 5,867,478 A * | 2/1999 | Baum et al. | .................... | 370/203 |
| 6,088,347 A * | 7/2000 | Minn et al. | .................... | 370/342 |
| 6,169,898 B1 * | 1/2001 | Hsu et al. | ................... | 455/432.3 |
| 6,188,717 B1 * | 2/2001 | Kaiser et al. | ................... | 375/148 |
| 6,192,068 B1 * | 2/2001 | Fattouche et al. | ............. | 375/130 |
| 6,263,029 B1 * | 7/2001 | Alard et al. | .................... | 375/340 |
| 6,904,283 B2 * | 6/2005 | Li et al. | .......................... | 455/450 |

(Continued)

FOREIGN PATENT DOCUMENTS

EP 1988667 A2 11/2008

OTHER PUBLICATIONS

Love, Robert, et al., "Downlink Control Channel Design for 3GPP LTE", Wireless Communications and Networking Conference, 2008, WCNC 2008, Piscataway, NJ, USA, Mar. 31, 2008, pp. 813-818, XP031243734.

(Continued)

*Primary Examiner* — Melody Mehrpour
(74) *Attorney, Agent, or Firm* — Rothwell, Figg, Ernst & Manbeck, P.C.

(57) ABSTRACT

Disclosed herein are systems and methods for choosing the size of the control region of a downlink subframe. For example, an apparatus for selecting the size of the control region based on a set of one or more physical downlink control channels (PDCCHs) is disclosed. The apparatus, in some embodiments, includes: a module configured to determine, for each of at least two or more control region sizes included in a set of two or more control region sizes, a subset of PDCCHs from said set of PDCCHs that can be assigned to a control region having a size equal to the control region size; and control region size selector for selecting a control region size for the subframe, wherein the control region size selector is configured to make the selection based, at least in part, on information pertaining to the subset of PDCCHs that can be assigned to a control region having a size equal to the selected control region size.

24 Claims, 4 Drawing Sheets

U.S. PATENT DOCUMENTS

| | | | |
|---|---|---|---|
| 7,039,001 B2 * | 5/2006 | Krishnan et al. | 370/203 |
| 7,391,750 B2 * | 6/2008 | Kim et al. | 370/329 |
| 7,502,310 B2 * | 3/2009 | Hwang et al. | 370/208 |
| 7,639,660 B2 * | 12/2009 | Kim et al. | 370/343 |
| 2003/0086366 A1 * | 5/2003 | Branlund et al. | 370/208 |
| 2004/0062193 A1 * | 4/2004 | Ma et al. | 370/208 |
| 2004/0190640 A1 * | 9/2004 | Dubuc et al. | 375/260 |
| 2005/0025039 A1 * | 2/2005 | Hwang et al. | 370/206 |
| 2005/0135324 A1 * | 6/2005 | Kim et al. | 370/343 |
| 2008/0298224 A1 * | 12/2008 | Pi et al. | 370/204 |
| 2009/0097447 A1 * | 4/2009 | Han et al. | 370/330 |
| 2010/0034303 A1 * | 2/2010 | Damnjanovic et al. | 375/260 |
| 2010/0329220 A1 * | 12/2010 | Kim et al. | 370/336 |

OTHER PUBLICATIONS

Motorola, Online, vol. R1-073373, No. 50, Aug. 20, 2007, pp. 1-11, XP002512720, Retrieved from the Internet: URL: http://www.3gpp.org/ftp/tsg_ran/WG1RL1/TSGR1_50/Docs/r1-073373.zip>.

International Search Report and Written Opinion issued on Oct. 15, 2009 in PCT/SE2008/051310, filed Nov. 14, 2008, 10 pages.

\* cited by examiner

SYSTEMS AND METHODS FOR SELECTING THE SIZE OF A CONTROL REGION OF A DOWNLINK SUBFRAME

TECHNICAL FIELD

The present invention relates to radio communication systems and methods for selecting the size of a control region of a downlink subframe.

BACKGROUND

A radio access technology standardized by the 3$^{rd}$ Generation Partnership Project (3GPP) is referred to as long term evolution (LTE). Only the packet-switched (PS) domain is supported by LTE. LTE is based on orthogonal frequency division multiplexing (OFDM) in the downlink and single-carrier frequency domain multiple access (SC-FDMA) in the uplink.

In the time domain, one subframe of 1 ms duration is divided into 12 or 14 OFDM (or SC-FDMA) symbols, depending on the configuration. One OFDM (or SC-FDMA) symbol consists of a number of sub-carriers in the frequency domain, depending on the channel bandwidth and configuration. One OFDM (or SC-FDMA) symbol on one sub-carrier is referred to as a resource element ("RE").

In LTE, no dedicated data channels are used. Instead, shared channel resources are used in both downlink and uplink. These shared resources, which are referred to as DL-SCH and UL-SCH, are each controlled by a scheduler that assigns different parts of the downlink and uplink shared channels to different communication devices (a.k.a., user equipments (UEs)) for reception and transmission respectively.

The assignment information for the DL-SCH and the UL-SCH are transmitted in a control region covering n OFDM symbols (n<=4) in the beginning of each downlink subframe. The DL-SCH is transmitted in a data region covering the rest of the OFDM symbols in each downlink subframe. The size of the control region (i.e., n) is set per subframe. The size is signalled to the UE for each subframe on a physical control format indicator channel (PCFICH). The PCFICH occupies a certain minor, pre-determined part of the control region, thereby making it independent of the number of OFDM symbols currently used for the control region.

Each assignment for DL-SCH or UL-SCH is transmitted on a physical downlink control channel (PDCCH) located in the control region. There are typically multiple PDCCHs in each subframe, and each UE is required to monitor the PDCCHs to detect the assignments directed to it. A PDCCH is mapped to a number of control channel elements (CCEs). A PDCCH consists of an aggregation of 1, 2, 4 or 8 CCEs. These four different alternatives are herein referred to aggregation level 1, 2, 4, and 8 respectively. Each CCE may only be utilized on one aggregation level at the time. The variable size achieved by the different aggregation levels is used to adapt the coding rate to the required block error rate (BLER) level for each PDCCH. The total number of available CCEs in a subframe will vary depending on several parameters, some of which are static (bandwidth and number of antennas), some are semi-static (physical HARQ indicator channel (PHICH) size and PHICH duration) and one is dynamic (number of OFDM symbols used for the control region). Each CCE consist of 36 REs. However, in order to achieve time and frequency diversity for the PDCCHs, each CCE and its' corresponding REs are spread out, both in time over the OFDM symbols used for PDCCH, and in frequency over the configured bandwidth. This is achieved through a number of operations including interleaving, and cyclic shifts etc.

The CCE mapping in the control region is also restricted in order to simplify the UE implementation. Depending on a radio network temporary identifier (RNTI), subframe number and CCE aggregation level, only a limited set of CCEs need to be searched for PDCCHs by a UE. These CCE sets are referred to as common search spaces and UE-specific search spaces depending on if the PDCCH is aimed at a group of UEs or to a specific UE. The UEs recognizes PDCCHs aimed at them by the RNTI tag that is attached to each PDCCH.

The PDCCHs are mapped on the control region of the subframe, which can consist of from one up to four OFDM symbols. If more than one OFDM symbol is used for the control region (e.g., two, three or four), then the available capacity for DL-SCH will be reduced correspondingly because there are only a fixed number OFDM symbols available per subframe (i.e., 12 or 14 OFDM symbols for normal and extended cyclic prefix respectively). Hence, the control region is an overhead that steals resources from the DL-SCH (i.e., the downlink peak throughput is affected if the control region is larger than what is absolutely required to carry the control channels). On the other hand, should the number of OFDM symbols for control not be set large enough to carry all PDCCHs required for both DL and UL assignments, then it may not be possible to send all DL and UL assignments to the UEs. This may result in the DL and/or UL throughput being degraded due to the limited capability to assign DL-SCH and UL-SCH resources to the UEs. Accordingly, it is not optimal to use a fixed control region size for each downlink subframe.

What is desired, therefore, are systems and methods for selecting, for each downlink subframe, the size of a control region for the downlink subframe.

SUMMARY

In one aspect, the present invention provides a method to configure the size of the control region of a downlink subframe so that both a low number and a large number of assignments can be optimally handled. This may be done on a subframe basis in order to adapt quickly to new traffic scenarios. Additionally, it may be desirable that the method take into account constraints like the restricted UE-specific search spaces and load control (i.e. an operation where the utilization of CCE is controlled).

For example, in one aspect, the invention provides a method performed by a network node (e.g., a base station) for setting the size of a control region of a subframe based on a set of one or more physical downlink control channels (PDCCHs). In some embodiments, the method includes the following steps: (a) selecting a first control region size from a set of control region sizes and determining a subset of the PDCCHs from said set of PDCCHs that can be assigned to a control region having a size equal to the first control region size; (b) selecting a second control region size from the set of control region sizes and determining a subset of the PDCCHs from said set of PDCCHs that can be assigned to a control region having a size equal to the second control region size; (c) after performing step (b), choosing a control region size for the subframe (e.g., choosing the most optimal control region size for the subframe), wherein the control region size is chosen based, at least in part, on information pertaining to the subset of PDCCHs that can be assigned to a control region having a size equal to the chosen control region size; and (d) setting the size of the control region of the subframe to the control region size chosen in step (c).

In some embodiments, the method also includes: (e) selecting another control region size from the set of control region sizes and determining a subset of the PDCCHs from said set of PDCCHs that can be assigned to a control region having a size equal to the another control region size; and (f) repeating step (e) until all of the control region sizes from the set of control region sizes has been selected, wherein steps (e) and (f) occur prior to step (c).

In some embodiments, the most optimal control region size is one of: (i) a control region size (e.g., the smallest control region size) corresponding to a subset of PDCCHs that includes the highest number of PDCCHs; (ii) a control region size (e.g., the smallest control region size) corresponding to a subset of PDCCHs that has the highest total priority weight; (iii) a control region size (e.g., the smallest control region size) that has the highest number of allocated control channel elements (CCEs); and (iv) a control region size (e.g., the smallest control region size) that has a ratio that is closest to a targeted ratio (e.g., a ratio of PDCCH uplink grants to PDCCH downlink assignments).

In some embodiments, the method also includes: (e) receiving, from one or more schedulers, information identifying the set of PDCCHs, wherein step (e) occurs prior to step (a); (f) after step (d), transmitting a first subframe, wherein the size of the control region of the first subframe is equal to the control region size selected in step (c); (g) receiving, from the one or more schedulers, information identifying a second set of PDCCHs, wherein step (g) occurs after step (e); (h) for each of at least two control region sizes included in the set of control region sizes, determining a subset of PDCCHs from said second set of PDCCHs that can be assigned to a control region having a size equal to the control region size; (i) choosing a control region size for a second subframe, wherein the selection is based, at least in part, on information pertaining to the subset of PDCCHs from the second set of PDCCHs that can be assigned to a control region having a size equal to the chosen control region size; (j) setting the size of the control region of the second subframe to the control region size chosen in step (i); and (k) after step (j), transmitting the second subframe.

In some embodiments, the step of determining the subset of PDCCHs from the set of PDCCHs that can be assigned to a control region comprises: (l) selecting a PDCCH from the set of PDCCHs; (m) determining whether the selected PDCCH can be assigned to the control region without violating a restriction; (n) assigning the selected PDCCH to the control region if it is determined that the selected PDCCH can be assigned without violating a restriction; and (o) performing steps (l)-(n) for each other PDCCH included in the set.

In some embodiments, the step of determining the subset of PDCCHs from said set of PDCCHs that can be assigned to a control region having a size equal to the selected control region size comprises determining the total number of PDCCHs included in each subset; and the step of choosing a control region size comprises selecting the smallest control region size to which the highest number of PDCCHs can be assigned.

In another aspect, the present invention provides an improved base station. In some embodiments, the base station includes: a scheduling module configured to schedule uplink and downlink resources and configured to produce information identifying a set of physical downlink control channels (PDCCHs) for transmission on a subframe; and a control region size selector configured to obtain the information identifying the set of PDCCHs, wherein the control region size selector is further configured to: (a) for each of at least two control region sizes included in a set of two or more control region sizes, determine a subset of PDCCHs from said set of PDCCHs that can be assigned to a control region having a size equal to the control region size, (b) choose a control region size for the subframe, wherein the control region size is chosen based, at least in part, on information pertaining to the subset of PDCCHs from the set of PDCCHs that can be assigned to a control region having a size equal to the chosen control region size, and (c) set the size of the control region of the subframe to the chosen control region size.

In another aspect, the present invention provides an apparatus for selecting the size of a control region for a downlink subframe based on a set of one or more physical downlink control channels (PDCCHs). In some embodiments, the apparatus includes: a module configured to determine, for each of at least two or more control region sizes included in a set of two or more control region sizes, a subset of PDCCHs from said set of PDCCHs that can be assigned to a control region having a size equal to the control region size; and control region size selector configured to select a control region size for the subframe, wherein the control region size selector is configured to make the selection based, at least in part, on information pertaining to the subset of PDCCHs that can be assigned to a control region having a size equal to the selected control region size.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
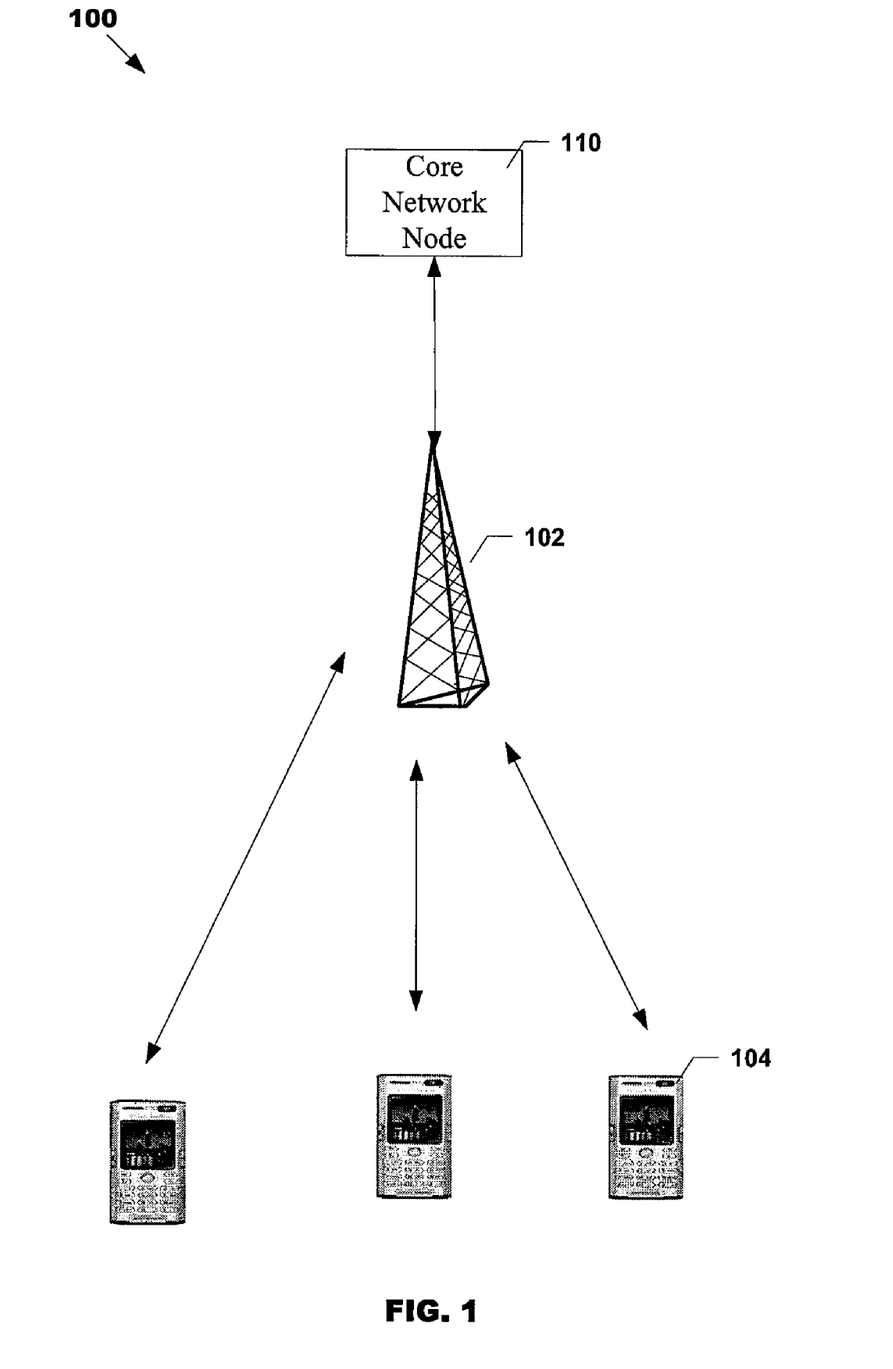
FIG. 1 illustrates a portion of a communications network.

Referring now to FIG. 1, FIG. 1 illustrates a portion of a communications network 100 according to embodiments of the invention. As illustrated, network 100 includes a base station 102 that may be in communication with a number of UEs 104 and that is interfaced with a core network 110. As discussed above, if base station 102 is an LTE base station, then base station 102 periodically transmits downlink subframes to UEs 104.

Figure 2:
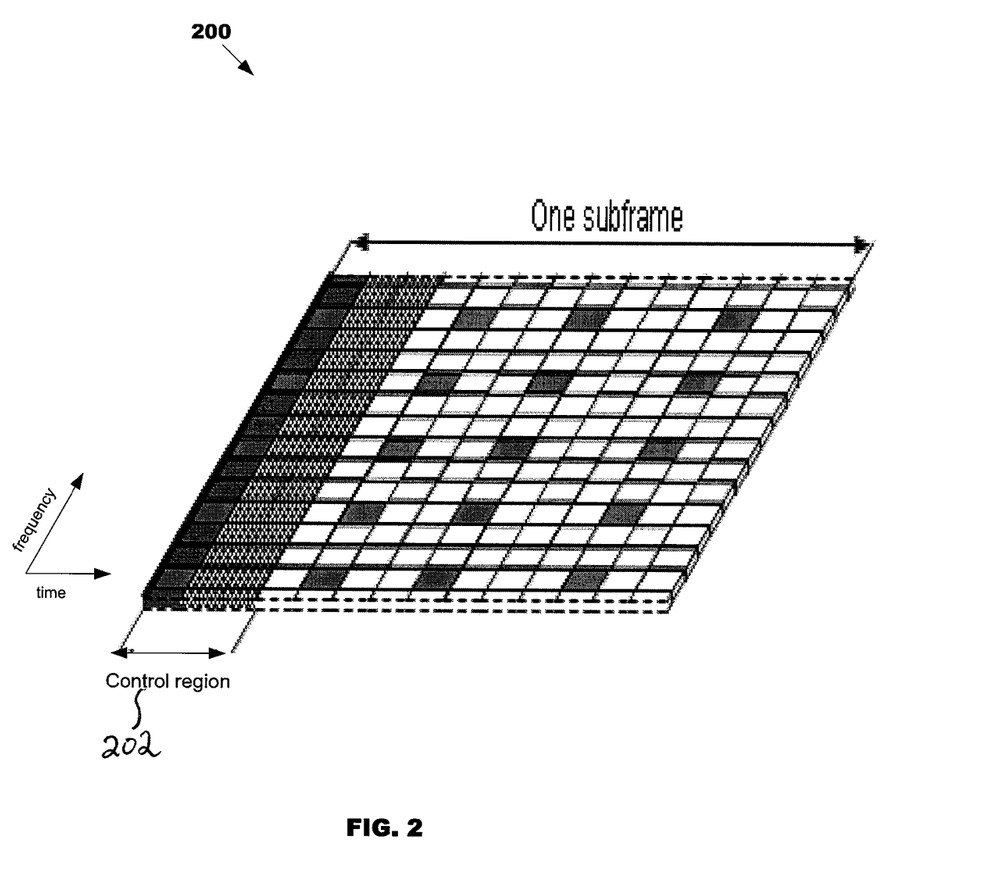
FIG. 2 illustrates a downlink subframe.

Referring now to FIG. 2, FIG. 2 illustrates an exemplary downlink subframe 200. As illustrated in FIG. 2, subframe 200 includes a control region 202. As discussed above, the size of the control region is not fixed. For example, the size of the control region may vary between one and four OFDM symbols. According to embodiments of the present invention, base station 102 is configured such that base station 102 selects the size of the control region for a subframe prior to transmitting the subframe to UEs 104. In some embodiments, base station 102 is configured such that, for each subframe that it transmits, base station 102 selects the size of the control region.

Figure 3:
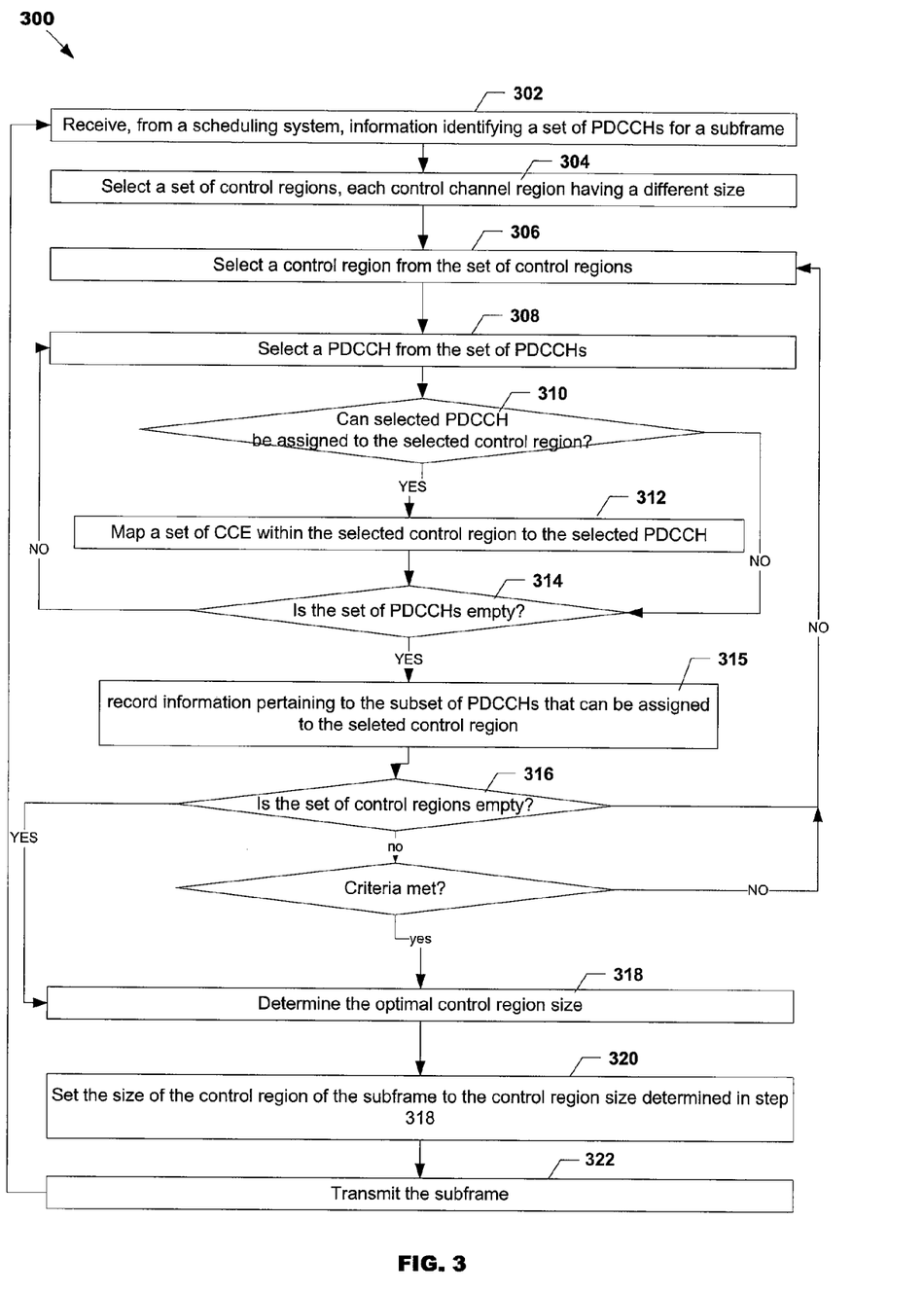
FIG. 3 is a flow chart illustrating a process according to some embodiments of the invention.

Referring now to FIG. 3, FIG. 3 is a flow chart illustrating a process 300 performed by base station 102 for selecting the size of the control region of a downlink subframe. Process 300 may begin in step 302, where base station 102 receives from a scheduling system information identifying a set of candidate PDCCHs for a particular downlink subframe. In step 304, base station 102 selects a set of valid control region sizes. For example, in step 304 base station 102 selects a first control region having a first valid size (e.g., 3 symbols) and selects a second control region have a second valid size (e.g., 4 symbols). The set of valid control region sizes may vary depending on bandwidth. For example, for some bandwidths (e.g., large bandwidths), at most the set of valid control regions sizes is (1, 2 and 3), while for other bandwidths (e.g., narrow bandwidths) at most the set of valid control regions sizes is (2, 3 and 4).

In step 306, base station 102 selects a control region size from the set of valid control region sizes. Additionally, base station 102 may "remove" the selected control region size from the set (e.g., base station 102 may store information indicating that the selected control region size has been selected so that it will not be selected again when determining what control region size to use for the particular subframe).

In step 308, base station 102 selects a candidate PDCCH from the set of candidate PDCCHs. The candidate PDCCH may be selected at random, based on size (e.g., largest selected first), or based on priority (e.g., PDCCHs with higher priority selected over PDCCHs with lower priority). Additionally, base station 102 may "remove" the selected PDCCH from the set (e.g., base station 102 may store information indicating that the selected PDCCH has been selected so that it will not be selected again when determining what control region size to use for the particular subframe).

In step 310, base station 102 determines whether the selected PDCCH can be assigned to a control region having a size equal to the selected control region size. For example, base station 102 determines whether the selected PDCCH can be assigned to the control region without violating some restriction. If the PDCCH can be assigned to the control region, then process 300 proceeds to step 312, otherwise process 300 proceeds to step 314.

In step 312, base station 104 maps a set of CEE within the selected control region to the selected PDCCH. Next (step 314), base station 104 determines whether the set of candidate PDCCHs is "empty" (i.e., base station 104 determines whether it has selected all of the candidate PDCCHs.). If the set is "empty," the process proceeds to step 315, otherwise it returns to step 308, where base station 104 selects another candidate PDCCH that has not yet been selected.

In step 315, base station 102 records information pertaining to the selected control region size. For instance, base station 102 records information pertaining to the subset of PDCCHs that can be assigned to the control region having a size equal to the selected control region size (the subset may include all of the candidate PDCCHs). For example, base station 102 may record the number of PDCCHs included in the subset. As another example, base station 102 may record information pertaining the priority weight of the PDCCHs included in the subset (e.g., each candidate PDCCH included in the subset may have a priority weight and base station 102 may record the average priority weight or maximum priority weight or a value representing some other function of the priority weights). As yet another example, base station 102 may record the ratio of PDCCH uplink grants to PDCCH downlink assignments for the subset. As still another example, base station 102 may record the total number of CCEs that are allocated to the candidate PDCCHs included in the subset.

Next (step 316), base station 102 determines whether the set of valid control region sizes is "empty" (i.e., base station 102 determines whether it has selected all of the valid control region sizes). If the set is "empty," the process proceeds to step 318, otherwise it proceeds to step 317. In step 317, base station 102 determines whether a criteria is met (e.g., base station 102 determines whether a PDCCH load level is fulfilled by, for example, determining whether the ratio of the number of used CCEs to the number of available CCEs is greater than a threshold). If the criteria is met, the process proceeds to step 318, otherwise it returns to step 306, where base station 102 selects another valid control region size that has not yet been selected.

In step 318, base station 102 determines the optimal control region. This determination may be based on the information recorded in step 315. For example, the optimal control region may be the control region that has the smallest control region size and has: (i) the highest number of PDCCHs included in the subset of PDCCHs that can be assigned to the control region; (ii) the highest PDCCH priority weight; (iii) the highest number of allocated control channel elements (CCEs); or (iv) that has a ratio that is closest to a targeted ratio (e.g., that has a ratio of PDCCH uplink grants to PDCCH downlink assignments that is closest to the targeted ratio).

In step 320, base station 102 sets the size of the control region for the particular subframe equal to the size of the control region determined in step 318. In step 322, base station 102 transmits the subframe. After step 322, process 300 may go back to step 302 so that base station 102 can perform the same steps for the next subframe that is to be transmitted.

In the above manner, the size of the control region can adapt to traffic conditions. Thus, a base station that implements the method described above can increase the chance of it achieving the maximum theoretical peak throughput when only a few users are active, while also, at the same time, support a large number of users.

Figure 4:
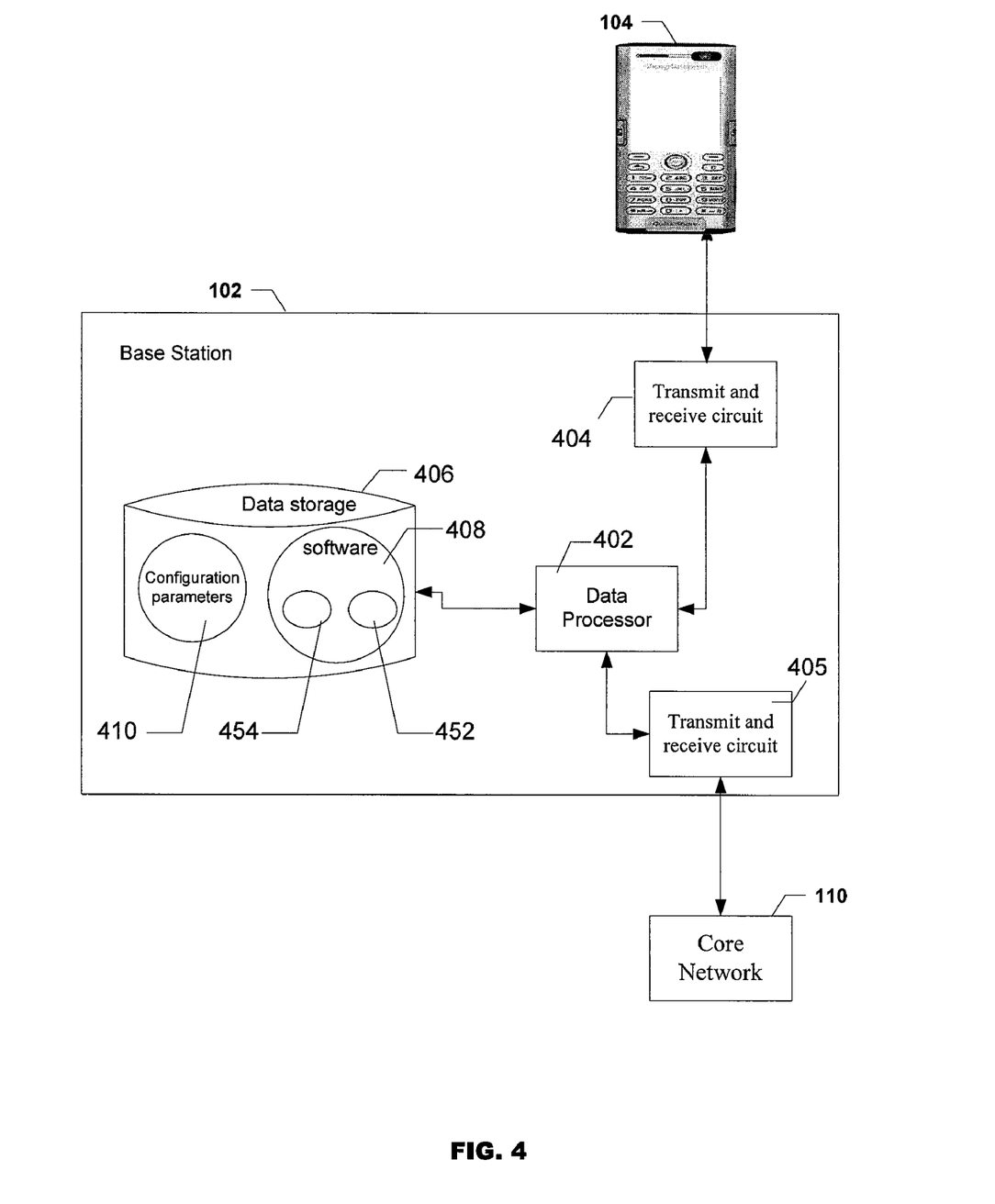
FIG. 4 is a functional block diagram of a base station according to an embodiment of the invention.

Referring now to FIG. 4, FIG. 4 is a functional block diagram of base station 102 according to some embodiments of the invention. As shown, base station 102 may comprise a data processor 402 (e.g., one or more microprocessors), a data storage system 406 (e.g., one or more non-volatile storage devices) and computer software 408 stored on the storage system 406. Configuration parameters 410 (e.g., the above mentioned targets) may also be stored in storage system 406. Base station 102 also may comprise transmit/receive (Tx/Rx) circuitry 404 for transmitting data to and receiving data from UEs 104 and transmit/receive (Tx/Rx) circuitry 405 for transmitting data to and receiving data from core network 110.

Software 408 is configured such that when processor 402 executes software 408, base station 102 performs steps described above with reference to the flow chart shown in FIG. 3. For example, software 408 may include: (1) a scheduling module 452 configured to schedule uplink and downlink resources and configured to produce information identifying a set of physical downlink control channels (PDCCHs) for transmission on a subframe; (2) a control region size selector module 454 configured to obtain the information identifying the set of PDCCHs and further configured to: (a) for each control region size included in a set of control region sizes, determine a subset of PDCCHs from said set of PDCCHs that can be assigned to a control region having a size equal to the control region size; and (b) select a control region size from the set of two or more control region sizes, wherein the selection is based, at least in part, on information pertaining to the subset of PDCCHs from the set of PDCCHs that can be assigned to a control region having a size equal to the selected control region size.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

What is claimed is:

1. A method performed by a network node for setting the size of a control region of a subframe based on a set of one or more physical downlink control channels (PDCCHs), comprising:
   (a) selecting a first control region size from a set of control region sizes and determining a subset of the PDCCHs from said set of PDCCHs that can be assigned to a control region having a size equal to the first control region size;
   (b) selecting a second control region size from the set of control region sizes and determining a subset of the PDCCHs from said set of PDCCHs that can be assigned to a control region having a size equal to the second control region size;
   (c) after performing step (b), choosing a control region size for the subframe, wherein the control region size is chosen based, at least in part, on information pertaining to the subset of PDCCHs that can be assigned to a control region having a size equal to the chosen control region size; and
   (d) setting the size of the control region of the subframe to the control region size chosen in step (c).

2. The method of claim 1, wherein step (c) comprises choosing the most optimal control region size.

3. The method of claim 2, wherein the most optimal control region size is one of:
   (i) a control region size corresponding to a subset of PDCCHs that includes the highest number of PDCCHs;
   (ii) a control region size corresponding to a subset of PDCCHs that has the highest total priority weight;
   (iii) a control region size that has the highest number of allocated control channel elements (CCEs); and
   (iv) a control region size that has a ratio that is closest to a targeted ratio.

4. The method of claim 3, wherein the most optimal control region size is one of:
   (i) the smallest control region size corresponding to a subset of PDCCHs that includes the highest number of PDCCHs;
   (ii) the smallest control region size corresponding to the subset of PDCCHs that has the highest total priority weight;
   (iii) the smallest control region size that has the highest number of allocated control channel elements (CCEs); and
   (iv) the smallest control region size that has a ratio that is closest to a targeted ratio.

5. The method of claim 4, wherein the ratio is a ratio of PDCCH uplink grants to PDCCH downlink assignments.

6. The method of claim 1, further comprising:
   (e) receiving, from one or more schedulers, information identifying the set of PDCCHs, wherein step (e) occurs prior to step (a);
   (f) after step (d), transmitting a first subframe, wherein the size of the control region of the first subframe is equal to the control region size selected in step (c);
   (g) receiving, from the one or more schedulers, information identifying a second set of PDCCHs, wherein step (g) occurs after step (e);
   (h) for each of at least two control region sizes included in the set of control region sizes, determining a subset of PDCCHs from said second set of PDCCHs that can be assigned to a control region having a size equal to the control region size;
   (i) choosing a control region size for a second subframe, wherein the selection is based, at least in part, on information pertaining to the subset of PDCCHs from the second set of PDCCHs that can be assigned to a control region having a size equal to the chosen control region size;
   (j) setting the size of the control region of the second subframe to the control region size chosen in step (i); and
   (k) after step (j), transmitting the second subframe.

7. The method of claim 6, wherein the step of determining the subset of PDCCHs from the set of PDCCHs that can be assigned to a control region comprises:
   (l) selecting a PDCCH from the set of PDCCHs;
   (m) determining whether the selected PDCCH can be assigned to the control region without violating a restriction;
   (n) assigning the selected PDCCH to the control region if it is determined that the selected PDCCH can be assigned without violating a restriction; and
   (o) performing steps (l)-(n) for each other PDCCH included in the set.

8. The method of claim 1, wherein
   the step of determining the subset of PDCCHs from said set of PDCCHs that can be assigned to a control region having a size equal to the selected control region size comprises determining the total number of PDCCHs included in each subset; and
   the step of choosing a control region size comprises selecting the smallest control region size to which the highest number of PDCCHs can be assigned.

9. The method of claim 1, wherein the network node is a base station.

10. The method of claim 1, further comprising:
    (e) selecting another control region size from the set of control region sizes and determining a subset of the PDCCHs from said set of PDCCHs that can be assigned to a control region having a size equal to the another control region size; and
    (f) repeating step (e) until all of the control region sizes from the set of control region sizes has been selected, wherein steps (e) and (f) occur prior to step (c).

11. A base station, comprising:
    a scheduling module configured to schedule uplink and downlink resources and configured to produce information identifying a set of physical downlink control channels (PDCCHs) for transmission on a subframe; and
    a control region size selector configured to obtain the information identifying the set of PDCCHs, wherein the control region size selector is further configured to:
    (a) for each of at least two control region sizes included in a set of two or more control region sizes, determine a subset of PDCCHs from said set of PDCCHs that can be assigned to a control region having a size equal to the control region size, (b) choose a control region size for the subframe, wherein the control region size is chosen based, at least in part, on information pertaining to the subset of PDCCHs from the set of PDCCHs that can be assigned to a control region having a size equal to the chosen control region size, and (c) set the size of the control region of the subframe to the chosen control region size.

12. The base station of claim 11, wherein the control region size selector is configured to perform step (b) by choosing the most optimal control region size.

13. The base station of claim 12, wherein the most optimal control region size is one of:

(i) a control region size corresponding to a subset of PDCCHs that includes the highest number of PDCCHs;

(ii) a control region size corresponding to a subset of PDCCHs that has the highest total priority weight;

(iii) a control region size that has the highest number of allocated control channel elements (CCEs); and (iv) a control region size that has a ratio that is closest to a targeted ratio.

14. The base station of claim 13, wherein the most optimal control region size is one of:

(i) the smallest control region size corresponding to a subset of PDCCHs that includes the highest number of PDCCHs;

(ii) the smallest control region size corresponding to the subset of PDCCHs that has the highest total priority weight;

(iii) the smallest control region size that has the highest number of allocated control channel elements (CCEs); and (iv) the smallest control region size that has a ratio that is closest to a targeted ratio.

15. The base station of claim 14, wherein the ratio is a ratio of PDCCH uplink grants to PDCCH downlink assignments.

16. The base station of claim 11, wherein the control region size selector is further operable to:

(d) receive, from one or more schedulers, information identifying the set of PDCCHs;

(e) receive, from the one or more schedulers, information identifying a second set of PDCCHs for a second subframe;

(f) for each of at least two control region sizes included in the set of control region sizes, determine a subset of PDCCHs from said second set of PDCCHs that can be assigned to a control region having a size equal to the control region size;

(g) choose a control region size for the second subframe, wherein the control region size is chosen based, at least in part, on information pertaining to the subset of PDCCHs from the second set of PDCCHs that can be assigned to a control region having a size equal to the selected control region size; and (h) set the size of the control region of the second subframe to the control region size chosen for the second subframe.

17. The base station of claim 11, wherein the control region size selector is configured to determine the subset of PDCCHs from said set of PDCCHs that can be assigned to a control region by:

(i) selecting a PDCCH from the set of PDCCHs;

(j) determining whether the selected PDCCH can be assigned to the control region without violating a restriction;

(k) assigning the selected PDCCH to the control region if it is determined that the selected PDCCH can be assigned without violating a restriction; and (l) performing steps (i)-(k) for each other PDCCH included in the set.

18. The base station of claim 11, wherein the control region size selector is configured to determine the total number of PDCCHs included in each subset; and is configured to chose a control region size by selecting the smallest control region size to which the highest number of PDCCHs can be assigned.

19. The base station of claim 11, wherein the control region size selector is configured to: for each control region sizes included in a set of two or more control region sizes, determine a subset of PDCCHs from said set of PDCCHs that can be assigned to a control region having a size equal to the control region size prior to choosing the control region size for the subframe.

20. An apparatus for selecting the size of a control region for a subframe based on a set of one or more physical downlink control channels (PDCCHs), comprising:

a module configured to determine, for each of at least two or more control region sizes included in a set of two or more control region sizes, a subset of PDCCHs from said set of PDCCHs that can be assigned to a control region having a size equal to the control region size; and control region size selector configured to select a control region size for the subframe, wherein the control region size selector is configured to make the selection based, at least in part, on information pertaining to the subset of PDCCHs that can be assigned to a control region having a size equal to the selected control region size.

21. The apparatus of claim 20, wherein the control region size selector is configured to select the control region size by selecting the most optimal control region size from said set of two or more control regions sizes.

22. The apparatus of claim 21, wherein the most optimal control region size is one of:

(i) a control region size corresponding to a subset of PDCCHs that includes the highest number of PDCCHs;

(ii) a control region size corresponding to a subset of PDCCHs that has the highest total priority weight;

(iii) a control region size that has the highest number of allocated control channel elements (CCEs); and (iv) a control region size that has a ratio that is closest to a targeted ratio.

23. The apparatus of claim 22, wherein the most optimal control region size is one of:

(i) the smallest control region size corresponding to a subset of PDCCHs that includes the highest number of PDCCHs;

(ii) the smallest control region size corresponding to the subset of PDCCHs that has the highest total priority weight;

(iii) the smallest control region size that has the highest number of allocated control channel elements (CCEs); and (iv) the smallest control region size that has a ratio that is closest to a targeted ratio.

24. The apparatus of claim 20, wherein the control region size selector is configured to determine the total number of PDCCHs included in each subset; and is configured to select a control region size from the set of two or more control region sizes by selecting the smallest control region size to which the highest number of PDCCHs can be assigned.

* * * * *